United States Patent
Yu et al.

(10) Patent No.: US 9,280,010 B2
(45) Date of Patent: Mar. 8, 2016

(54) CURVATURE-ADJUSTABLE BACKPLANE AND LIQUID CRYSTAL DISPLAY DEVICE HAVING SAME

(71) Applicant: Shenzhen China Star Optoelectronics Technology Co., Ltd., Shenzhen, Guangdong (CN)

(72) Inventors: Yajun Yu, Guangdong (CN); Yuchun Hsiao, Guangdong (CN); Guofu Tang, Guangdong (CN); Chengling Lv, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/378,621

(22) PCT Filed: Jul. 18, 2014

(86) PCT No.: PCT/CN2014/082533
§ 371 (c)(1),
(2) Date: Aug. 13, 2014

(87) PCT Pub. No.: WO2016/000283
PCT Pub. Date: Jan. 7, 2016

(65) Prior Publication Data
US 2016/0004117 A1    Jan. 7, 2016

(30) Foreign Application Priority Data
Jul. 3, 2014 (CN) .............................. 201410317221

(51) Int. Cl.
*G02F 1/1333* (2006.01)

(52) U.S. Cl.
CPC ................... *G02F 1/133308* (2013.01); *G02F 2001/133314* (2013.01)

(58) Field of Classification Search
CPC ............... G02F 1/133308; G02F 2001/133314
See application file for complete search history.

(56) References Cited

U.S. PATENT DOCUMENTS

| | | | | |
|---|---|---|---|---|
| 1,987,167 A | * | 1/1935 | Valverde .................. | G01K 5/68 374/E5.04 |
| 2004/0108044 A1 | * | 6/2004 | Shioya ..................... | H01J 9/185 156/160 |
| 2014/0118910 A1 | * | 5/2014 | Sung ........................ | G09F 9/301 361/679.01 |

* cited by examiner

*Primary Examiner* — Donald Raleigh
(74) *Attorney, Agent, or Firm* — Andrew C. Cheng (57) ABSTRACT

The present invention provides a curvature-adjustable backplane and a liquid crystal display device having the backplane. The curvature-adjustable backplane includes a bottom plate (1). The bottom plate (1) is made of a material of thermal bimetal. The bottom plate (1) includes a plurality of openings (11) formed therein to extend in a lengthwise direction or a widthwise direction thereof, whereby the plurality of openings (11) helps increase a localized length-to-width ratio (L1/W1) of the bottom plate (1) so that when the curvature-adjustable backplane undergoes curving deformation, the extent of curving thereof in a lengthwise direction of the openings is far greater than the extent of curving thereof in a widthwise direction of the openings to realize precise adjustment of the curvature of the backplane and help release the stress of the backplane resulting from deformation and thus making the deformation of the backplane easy.

5 Claims, 6 Drawing Sheets

CURVATURE-ADJUSTABLE BACKPLANE AND LIQUID CRYSTAL DISPLAY DEVICE HAVING SAME

BACKGROUND OF THE INVENTION

1. Field of the Invention

The present invention relates to the field of liquid crystal displaying, and in particular to a curvature-adjustable backplane and liquid crystal display device having the backplane.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

A liquid crystal display generally comprises an enclosure, a liquid crystal panel arranged in the enclosure, and a backlight module mounted in the enclosure. The principle of operation of the liquid crystal panel is that liquid crystal molecules are arranged between two parallel glass substrates and a plurality of vertical and horizontal tiny electrical wires are arranged between the two glass substrates and electricity is applied to control the liquid crystal molecules to change direction in order to refract light emitting from the backlight module to pass through a pixel structure formed on the glass substrates to generate a color image. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel and light is homogenized by a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the displaying technology, major manufacturers have marketed curved display devices, such as curved televisions, one after another. Generally speaking, the curved display devices allow for the best viewing effect from edge to edge, while a regular display device has poor capability of displaying at edges of a screen. The curved display devices have a screen that is entirely of a curved design to provide a wide full-view image, allowing for the same visual enjoyment at both the central portion and the circumferential portion of the screen and also reducing distortion of off-axis viewing for viewing at a short distance. Further, the curved display devices allow a viewer's viewing distance to be extended, achieving better experience of viewing. Thus, compared to the regular display devices, the curved display devices have advantages, including: (1) brand differentiating, (2) wider viewable angle, and (3) reducing distortion for short distance viewing.

The conventional ways of forming a curved liquid crystal display generally include: (1) mounting a support rack having a specific curve to a backplane to force the backplane to deform into a curve consistent with that of the rack; and (2) directly forming a structure of a curved surface on the backplane. However, a backplane formed with either one of these ways is generally curved with a fixed curvature and thus the curvature of a display device obtained with the two ways is fixed. No adjustment of the curvature is available to suit users' need of watching or to allow for switching between a planar display device and a curved display device, whereby the view angle is subjected to undesired constraint.

Figure 1:
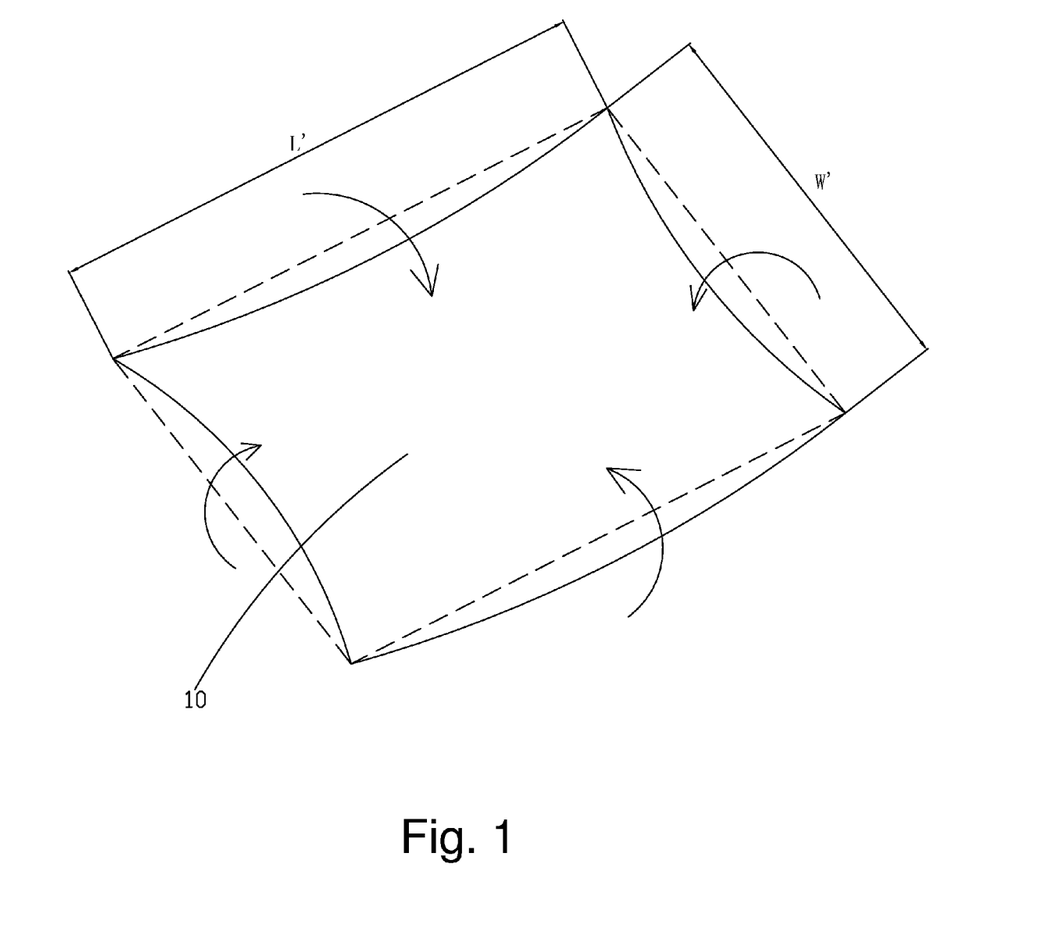
FIG. 1 is a schematic view illustrating a curved condition of a conventional curvature-adjustable backplane made of a thermal bimetal.

A thermal bimetal is a composite material composed of two (or more) metal layers or alloy layers having different thermal expansion coefficients that are securely bonded together. One of the layers has a lower thermal expansion coefficient and is a passive layer. The other layer has a higher thermal expansion coefficient and is an active layer. The active layer and the passive layer both have relatively high internal resistances. When electricity is applied to the thermal bimetal, the active layer and the passive layer generate a great amount of heat quickly, leading to a rise of temperature. The deformation of the active layer resulting from thermal expansion is apparently greater than the deformation of the passive layer resulting from thermal expansion and this makes the thermal bimetal to curve toward the side of the passive layer. Due to the thermal bimetal being sensitive to temperature and showing a characteristic that the amount of curving deformation can be controlled through controlling the temperature, the thermal bimetal can be used to make a backplane of a liquid crystal display device, wherein adjustment of the curvature of the liquid crystal display device or switching between a planar display and a curved display can be achieved through controlling the curvature of the backplane. However, as shown in FIG. 1, a conventional curvature-adjustable backplane made of a thermal bimetal suffers certain drawbacks, which are that since the lengthwise and widthwise dimensions of a liquid crystal display device are relatively great and a backplane 10 made of a thermal bimetal has a relatively small aspect ratio L'/W', in the process when the backplane 10 is subjected to heating and thus deformation, obvious curving and deformation occurs in all the directions so that it is not possible for the liquid crystal display device to achieve a precise adjustment of the curvature thereof and thus it is not possible to achieve a desired curved condition.

SUMMARY OF THE INVENTION

An object of the present invention is to provide a curvature-adjustable backplane, which allows for a more precise adjustment of a curvature of the backplane and also helps release stress induced in the deformation of the backplane so as to make deformation of the backplane easy.

Another object of the present invention is to provide a liquid crystal display device having the curvature-adjustable backplane, which allows for easy and precise adjustment of the curvature of the liquid crystal display device to enable users to obtain a desired condition of displaying during watching to suit different needs so as to improve the appeal of products to the market.

To achieve the above objects, the present invention provides a curvature-adjustable backplane, which comprises a bottom plate. The bottom plate is made of a material of thermal bimetal. The bottom plate comprises a plurality of openings formed therein to extend in a lengthwise direction or a widthwise direction thereof, whereby the plurality of openings increases a localized length-to-width ratio of the bottom plate.

Each of the openings is in a form of an elongate slender strip and is parallel to each other.

The openings have a length-to-width ratio that is greater than or equal to 10:1.

The openings have a width less than or equal to 5 mm and each of the openings is in the form of an elongate rectangle.

The plurality of openings is arranged in multiple rows and the openings of the multiple rows are parallel to each other.

The present invention also provides a liquid crystal display device, which comprises a backplane, an optical component arranged in the backplane, a backlight source arranged in the backplane, a mold frame mounted above the backlight source, a liquid crystal panel positioned on the mold frame, and a bezel fixed the liquid crystal panel to the mold frame. The backplane comprises a bottom plate. The bottom plate is made of a material of thermal bimetal. The bottom plate comprises a plurality of openings formed therein to extend in a lengthwise direction or a widthwise direction thereof, whereby the plurality of openings increases a localized length-to-width ratio of the bottom plate.

Each of the openings is in a form of an elongate slender strip and is parallel to each other.

The openings have a length-to-width ratio that is greater than or equal to 10:1.

The openings have a width less than or equal to 5 mm and each of the openings is in the form of an elongate rectangle.

The plurality of openings is arranged in multiple rows and the openings of the multiple rows are parallel to each other.

The efficacy of the present invention is that the present invention provides a curvature-adjustable backplane, which comprises a plurality of openings formed in a bottom plate made of a thermal bimetal in such a way that the plurality of openings extends in a lengthwise direction or a widthwise direction of the bottom plate to increase a localized length-to-width ratio of the bottom plate, whereby when the curvature-adjustable backplane undergoes curving deformation, the extent of curving in the lengthwise direction of the openings is greater than the extent of curving in the widthwise direction of the openings so as to realize precise adjustment of the curvature of the backplane and help release stress resulting from the deformation of the backplane, making deformation of the backplane easy. The present invention provides a liquid crystal display device comprising the curvature-adjustable backplane, which helps achieve easy and precise adjustment of the curvature of the liquid crystal display device, allowing a user to obtain a desired displaying condition when watching and also to enhance product appeal to the market.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
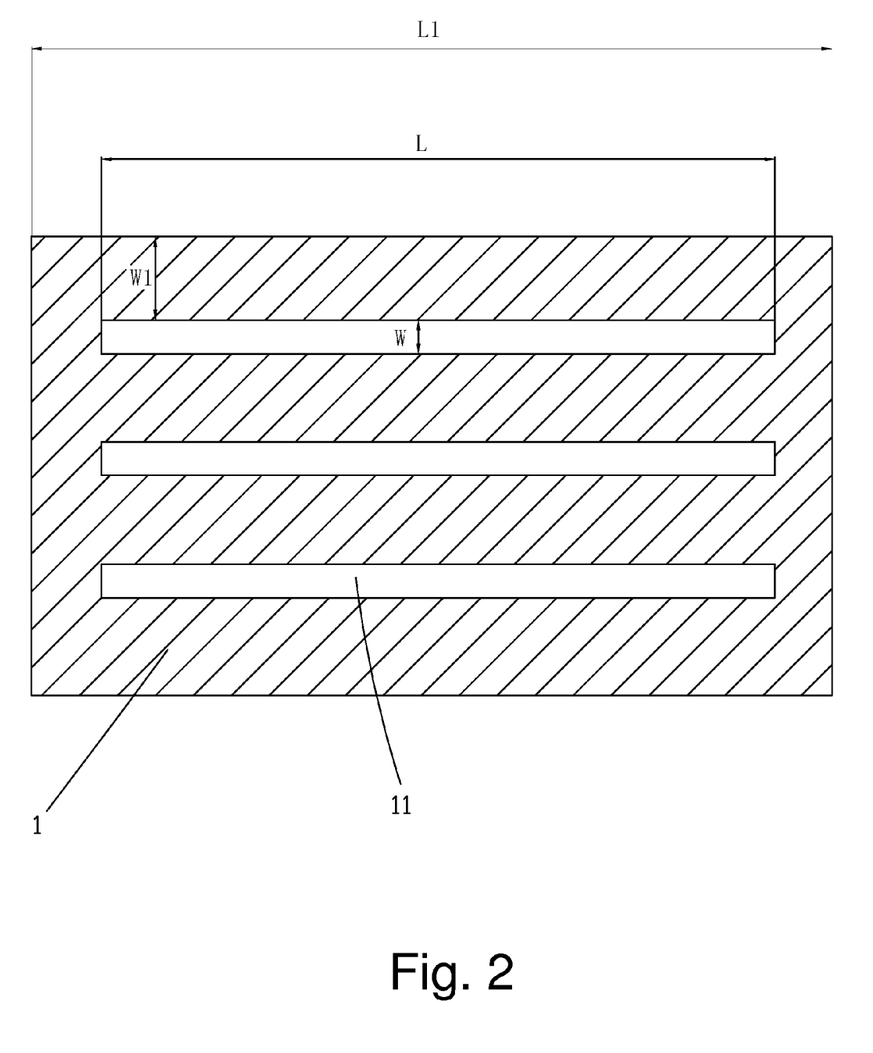
FIG. 2 is a schematic view illustrating a curvature-adjustable backplane according to a first embodiment of the present invention in a flat condition.
Figure 3:
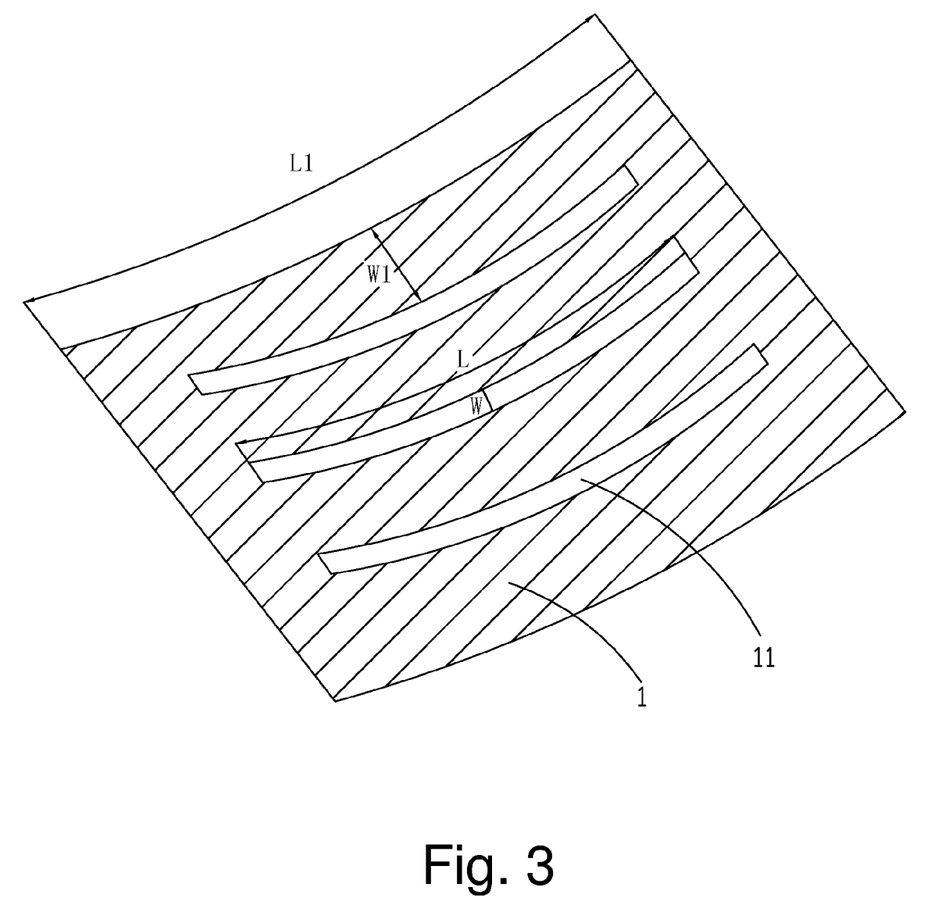
FIG. 3 is a schematic view illustrating the curvature-adjustable backplane according to the first embodiment of the present invention in a curved condition.

Referring to FIGS. 2 and 3, a curvature-adjustable backplane according to a first embodiment of the present invention is shown. The curvature-adjustable backplane comprises a bottom plate 1. The bottom plate 1 is made of a material of thermal bimetal. The thermal bimetal is a composite material composed of layers of metal or alloy having different thermal expansion coefficients that are securely bonded together. One of the layers has a lower thermal expansion coefficient and is a passive layer. Another layer has a higher thermal expansion coefficient and is an active layer. The active layer and the passive layer both have relatively high internal resistances. Specifically, the material of the active layer can be brass, nickel, or Fe—Ni—Cr, Fe—Ni—Mn, or Mn—Ni—Cu alloy and the material of the passive layer can be Invar alloy containing 34%-50% Ni.

In the first embodiment, the bottom plate 1 comprises a plurality of openings 11 formed therein to extend in a lengthwise direction thereof. Each of the openings 11 is in the form of an elongate slender strip. The plurality of openings 11 is parallel to each other and divides the bottom plate 1 into a plurality of zones having a length of L1 and a width of W1 to increase a localized length-to-width ratio, L1/W1, of the bottom plate 1.

Further, the openings 11 have a length-to-width ratio L/W≥10:1 and preferably, the openings 11 have a width W≤5 mm and each of the openings 11 is in the form of an elongate rectangle.

As shown in FIG. 2, when no electricity is applied to the curvature-adjustable backplane, the bottom plate 1 is in a flat planar condition, with which the curvature-adjustable backplane may serve as a flat planar backplane.

As shown in FIG. 3, when electricity is applied to the curvature-adjustable backplane, since the bottom plate 1 is made of a thermal bimetal, of which the active layer and the passive layer quickly generate a great amount of heat, leading to temperature rise with the thermal expansion induced deformation of the active layer apparently greater than the thermal expansion induced deformation of the passive layer, the bottom plate 1 is forced to curve toward the side associated with the passive layer. Further, since the plurality of openings 11 divides the bottom plate 1 into a plurality of zones having a length of L1 and a width of W1, the localized length-to-width ratio, L1/W1, of the bottom plate 1 is increased, making the extent of curving of the curvature-adjustable backplane in the lengthwise direction of the openings 11 far greater than in the extent of curving in the widthwise direction of the openings 11, thereby avoiding the situation that obvious curving deformation occurs in all directions, so that the curving of the curvature-adjustable backplane in the lengthwise direction of the bottom plate 1 may achieve a desired curved condition to realize a precise adjustment of the curvature of the backplane.

When the supply of electricity to the curvature-adjustable backplane is cut off, the curvature-adjustable backplane gradually restores the flat planar condition shown in FIG. 2.

It is noted here that in the process that the curvature-adjustable backplane generates curving deformation or restores to a flat planar condition, the plurality of openings 11 also provides an effect of cushioning to help release stress when the curvature-adjustable backplane undergoes deformation, thereby making the deformation easy.

Figure 4:
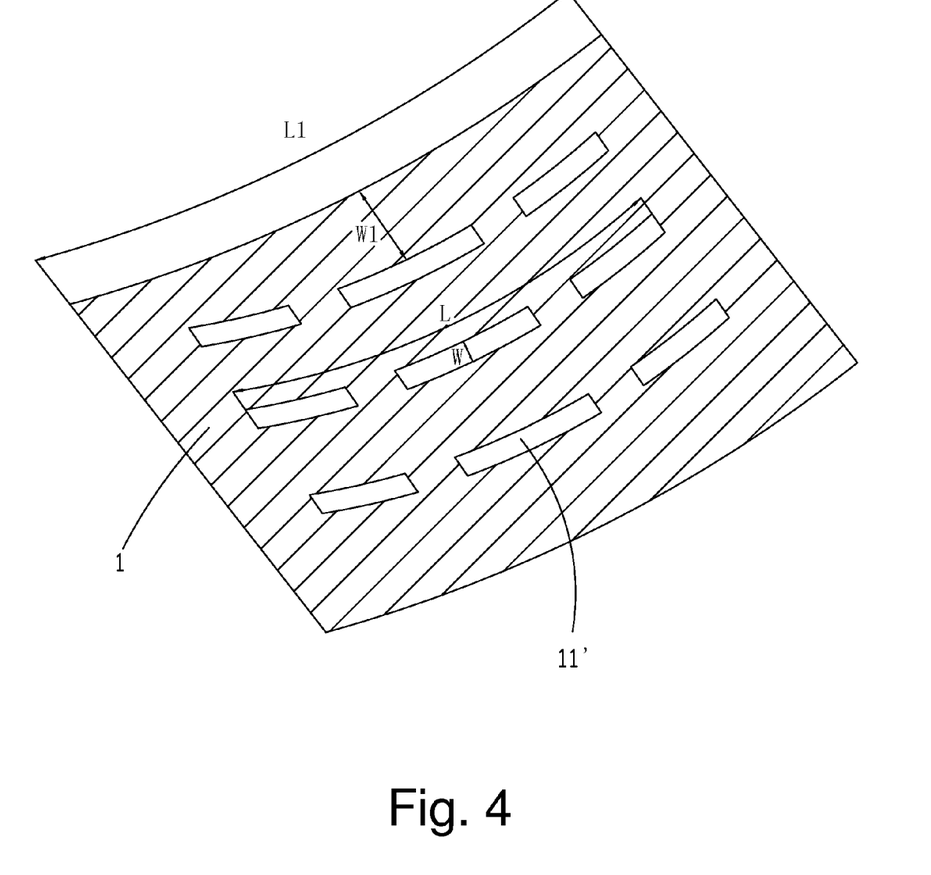
FIG. 4 is a schematic view illustrating a curvature-adjustable backplane according to a second embodiment of the present invention in a curved condition.

FIG. 4 shows a curvature-adjustable backplane according to a second embodiment of the present invention, which is different from the first embodiment in that a plurality of openings 11' is arranged in multiple rows and the openings 11' of the rows are parallel to each other, making it easy to manufacture. The remaining portions are identical to those of the first embodiment and repeated description will be omitted here.

Figure 5:
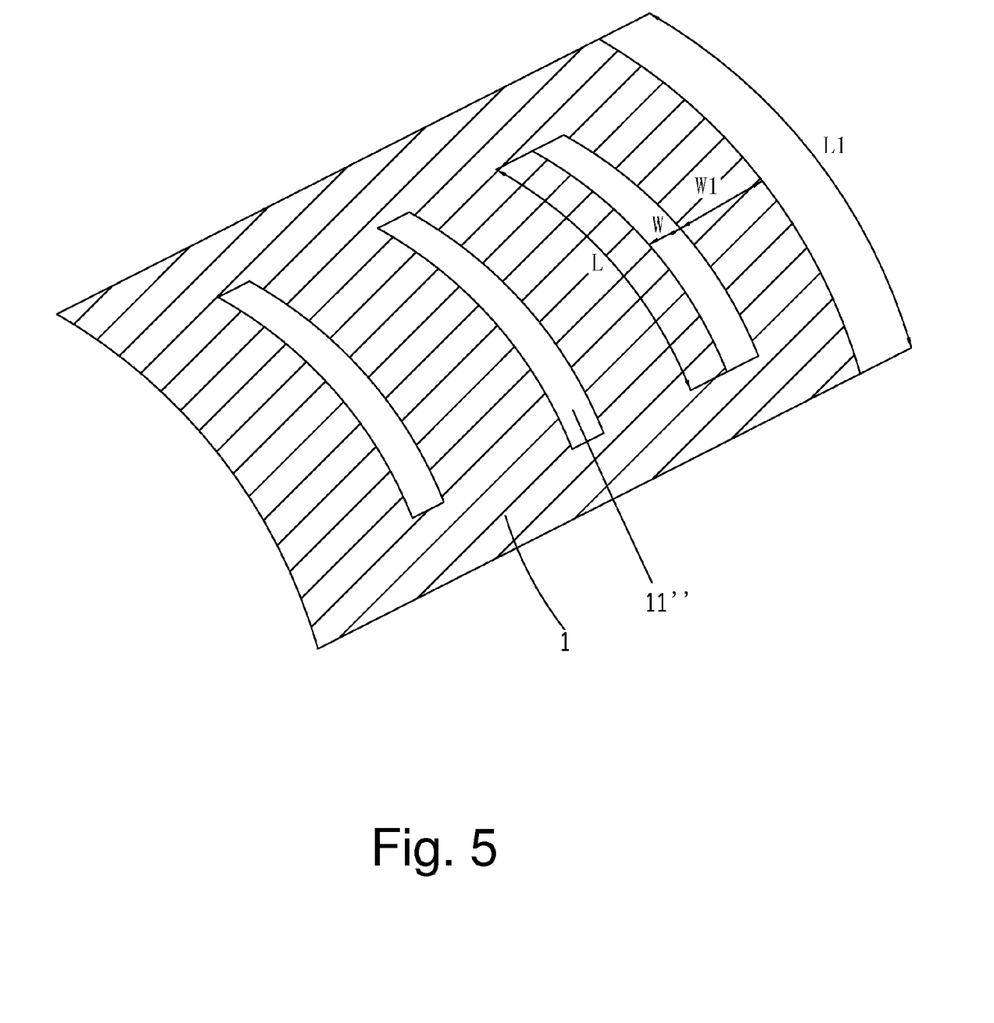
FIG. 5 is a schematic view illustrating a curvature-adjustable backplane according to a third embodiment of the present invention in a curved condition.

FIG. 5 shows a curvature-adjustable backplane according to a third embodiment of the present invention, which is different from the first embodiment in that a bottom plate 1 comprises a plurality of openings 11" formed therein to extend in a widthwise direction thereof.

When electricity is applied to the curvature-adjustable backplane of the third embodiment, the extent of curving of the curvature-adjustable backplane in a lengthwise direction of the openings 11" is far greater than the extent of curving in a widthwise direction of the openings 11", thereby avoiding the situation that obvious curving deformation occurs in all directions, so that the curving of the curvature-adjustable backplane in the widthwise direction of the bottom plate 1 may achieve a desired curved condition to realize a precise adjustment of the curvature of the backplane.

It is certain that the plurality of openings 11" can be arranged in multiple parallel rows.

The remaining portions are identical to those of the first embodiment and repeated description will be omitted here.

Figure 6:
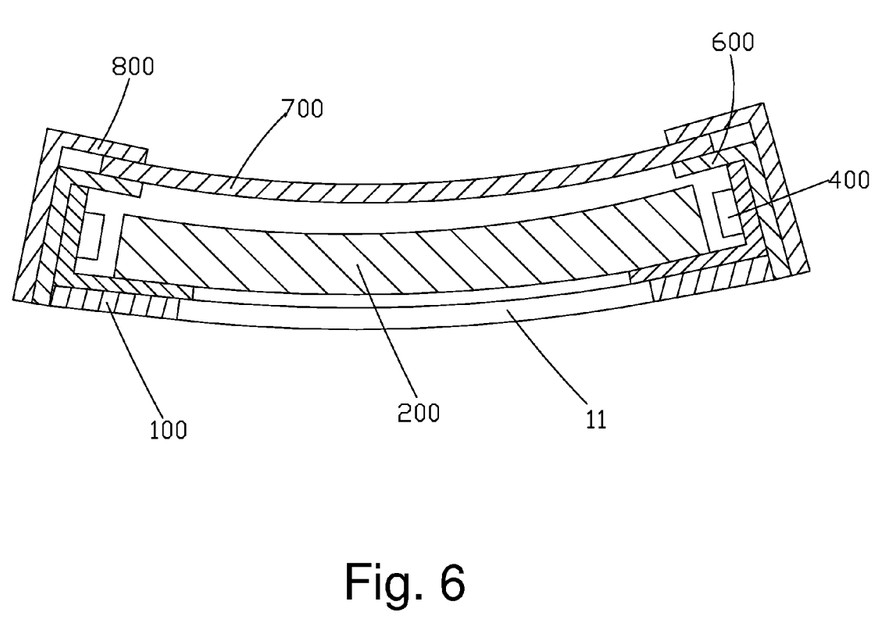
FIG. 6 is a schematic view showing a liquid crystal display device having a backplane according to the present invention.

Referring to FIG. 6, with additional reference to FIGS. 2-5, the present invention also provides a liquid crystal display device having a curvature-adjustable backplane, which comprises a backplane 100, an optical component 200 arranged in the backplane 100, a backlight source 400 arranged in the backplane 100, a mold frame 600 mounted above the backlight source 400, a liquid crystal panel 700 positioned on the mold frame 600, and a bezel 800 fixed the liquid crystal panel 700 to the mold frame 600. The backplane 100 comprises a bottom plate 1. The bottom plate 1 is made of a material of thermal bimetal. The bottom plate 1 comprises a plurality of openings 11 formed therein to extend in a lengthwise direction or a widthwise direction. With the arrangement of the plurality of openings 11, a localized length-to-width ratio, L1/W1, of the bottom plate 1 is increased to thereby make the curvature of the backplane 100 precisely adjustable.

Specifically, each of the openings 11 is in the form of an elongate slender strip and parallel to each other.

The openings 11 have a length-to-width ratio L/W≥10:1. Preferably, the openings 11 have a width W≤5 mm and each of the openings 11 is in the form of an elongate rectangle.

As described in the first embodiment of the above-discussed curvature-adjustable backplane, the backplane 100 can be such that the bottom plate 1 comprises a plurality of openings 11 formed therein to extend in a lengthwise direction. When electricity is applied to the backplane 100, the backplane 100 curves in the lengthwise direction of the openings 11 by an extent that is greater than the extent of curving thereof in a widthwise direction of the openings 11 so as to avoid the situation that obvious curving deformation occurs in all directions thereby making the curving of the backplane 100 in the lengthwise direction of the bottom plate 1 reach a desired curved condition and precise adjustment of the curvature of the backplane 100 can be achieved. Further, with the easy performance of precise adjustment of the curvature of the backplane 100, each and precise adjustment of the curvature of the liquid crystal display device can be achieved.

As described in the second embodiment of the above-discussed curvature-adjustable backplane, the backplane 100 can be such that a plurality of openings 11' is arranged in multiple rows and the openings 11' of the multiple rows are parallel to each other.

As described in the third embodiment of the above-discussed curvature-adjustable backplane, the backplane 100 can be such that the bottom plate 1 comprises a plurality of openings 11" formed therein to extend in the widthwise direction thereof. When electricity is applied to the backplane 100, the backplane 100 curves in the lengthwise direction of the openings 11" by an extent that is greater than the extent of curving thereof in a widthwise direction of the openings 11 so as to avoid the situation that obvious curving deformation occurs in all directions thereby making the curving of the backplane 100 in the widthwise direction of the bottom plate 1 reach a desired curved condition and precise adjustment of the curvature of the backplane 100 can be achieved. Further, with the easy performance of precise adjustment of the curvature of the backplane 100, each and precise adjustment of the curvature of the liquid crystal display device can be achieved.

In summary, the present invention provides a curvature-adjustable backplane, which comprises a plurality of openings formed in a bottom plate made of a thermal bimetal in such a way that the plurality of openings extends in a lengthwise direction or a widthwise direction of the bottom plate to increase a localized length-to-width ratio of the bottom plate, whereby when the curvature-adjustable backplane undergoes curving deformation, the extent of curving in the lengthwise direction of the openings is greater than the extent of curving in the widthwise direction of the openings so as to realize precise adjustment of the curvature of the backplane and help release stress resulting from the deformation of the backplane, making deformation of the backplane easy. The present invention provides a liquid crystal display device comprising the curvature-adjustable backplane, which helps achieve easy and precise adjustment of the curvature of the liquid crystal display device, allowing a user to obtain a desired displaying condition when watching and also to enhance product appeal to the market.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising a backplane, an optical component arranged in the backplane, a backlight source arranged in the backplane, a mold frame mounted above the backlight source, a liquid crystal panel positioned on the mold frame, and a bezel fixed the liquid crystal panel to the mold frame, the backplane comprising a bottom plate, the bottom plate being made of a material of thermal bimetal, the bottom plate comprising a plurality of openings formed therein to extend in a lengthwise direction or a widthwise direction thereof, whereby the plurality of openings increases a localized length-to-width ratio of the bottom plate.

2. The liquid crystal display device as claimed in claim 1, wherein each of the openings is in a form of an elongate slender strip and is parallel to each other.

3. The liquid crystal display device as claimed in claim 2, wherein the openings have a length-to-width ratio that is greater than or equal to 10:1.

4. The liquid crystal display device as claimed in claim 3, wherein the openings have a width less than or equal to 5 mm and each of the openings is in the form of an elongate rectangle.

5. The liquid crystal display device as claimed in claim 1, wherein the plurality of openings is arranged in multiple rows and the openings of the multiple rows are parallel to each other.

* * * * *